United States Patent [19]

Roehrick

[11] 4,081,666
[45] Mar. 28, 1978

[54] ECOLARIUM LIGHTS

[76] Inventor: Otto Adolf Roehrick, 1333 Elkhorn Blvd., Rio Linda, Calif. 95673

[21] Appl. No.: 662,809

[22] Filed: Mar. 1, 1976

[51] Int. Cl.² ............................................. F21P 1/02
[52] U.S. Cl. ........................................ 362/253; 119/5; 362/362; 362/806
[58] Field of Search ............... 240/10 R, 10 F, 10.1; 119/5; 428/13, 14; 206/45; 46/12, 13, 91, 92; 272/8 R, 8 D, 11, 69; 47/69, 66; D30/6–10

[56] References Cited

U.S. PATENT DOCUMENTS

| D. 86,581 | 3/1932 | Oberto | 240/10 R |
|---|---|---|---|
| 423,654 | 3/1940 | Amet | 46/12 |
| 2,190,544 | 2/1940 | Jarnagin | 119/5 |
| 2,415,514 | 2/1947 | Mayes | 240/10 R |
| 2,615,266 | 10/1952 | Wallin et al. | 240/10.1 |
| 2,636,314 | 4/1953 | Martinez | 240/10.1 |
| 2,751,880 | 6/1956 | Markowski | 119/5 |
| 2,773,175 | 12/1956 | Levy et al. | 240/10 F |
| 3,077,697 | 2/1963 | Fry | 119/5 |
| 3,141,442 | 7/1964 | Harris | 119/5 |
| 3,269,578 | 8/1966 | Lewis | D30/6 |

FOREIGN PATENT DOCUMENTS

| 666,976 | 2/1952 | United Kingdom | 240/10 R |
|---|---|---|---|
| 735,516 | 8/1955 | United Kingdom | 240/10 R |

Primary Examiner—Russell E. Adams

[57] ABSTRACT

An ornamental lighting device to be used on the terraneous shelf of an Ecolarium, ecology tank, (two-tiered aquarium) simultaneously providing light for the aqueous area underneath the terraneous shelf and ornamental lighting effects of the garden area of the terraneous shelf. The device having an easily removable cap containing a light socket, a male connector, the base containing light and heat vents and a downward light vent also the female electrical connector.

5 Claims, 4 Drawing Figures

U.S. Patent    March 28, 1978    4,081,666
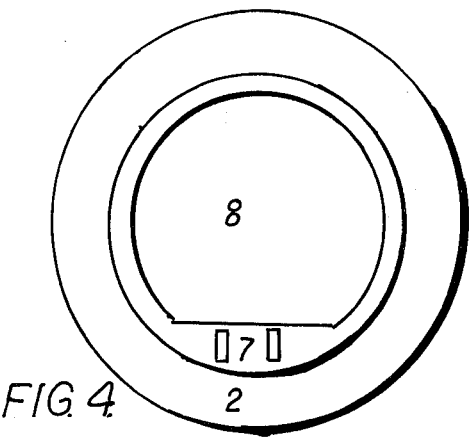
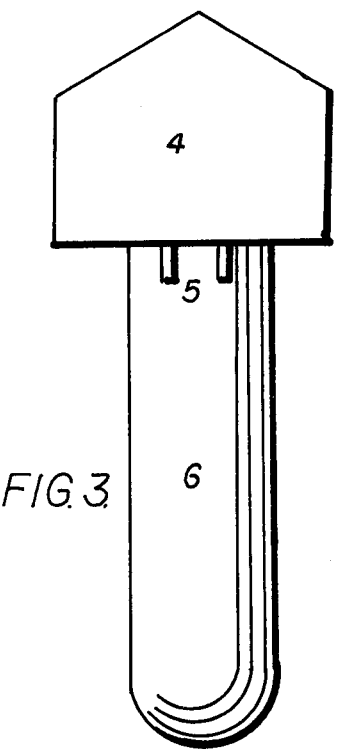
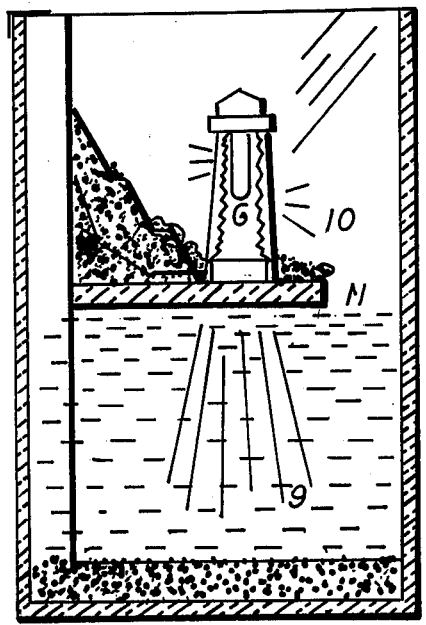
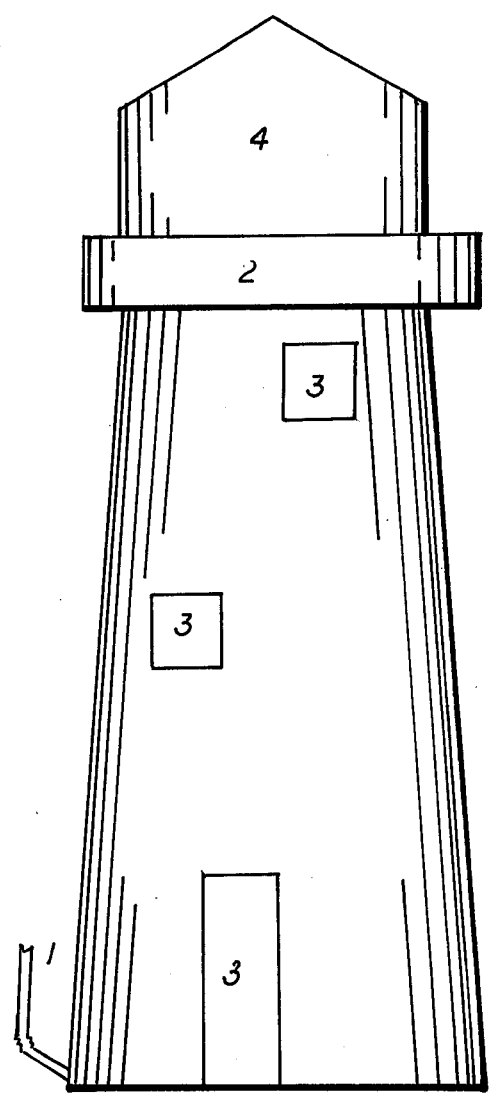

ECOLARIUM LIGHTS

BACKGROUND OF THE INVENTION

In the past a number of persons have endeavored to add a terraneous tier or shelf to aquariums for plant or animal life such as Harris with U.S. Pat. No. 3,141,442 and R. B. Lewis with Pat. No. 3,269,576 and my ecology tank which I call an Ecolarium. This of course greatly darkened the aqueous viewing area making it necessary to find a new light source, To solve this I made ornamental sculptures, i.e., houses, animals, birds, autos, trains, etc. of wood, metal, plastic, and ceramic containing the said lighting embodiments and which I have disclosed by way of example, each having a base portion containing downward light vents for illumination of the aqueous area and ornamental heat and light vents to simultaneously light the terraneous shelf.

SUMMARY OF THE INVENTION

A container having simultaneously an aqueous and terraneous area, the terraneous area being horizontally above the aqueous area. Nowhere have I seen or heard of any means by which the aqueous area could be illuminated in the event a terraneous area was placed above the aqueous area. Since the light from a conventional hood would not penetrate the soil area it is therefore the object of this invention the Ecolarium Lights to be a compliment to the terraneous area giving a lighted garden effect on the terranius tier and simultaneously providing illumination for the aqueous area.

Still another object of this invention is that one can control where and where not he wants algae growth in the aqueous area, since proper placement will prevent direct light rays from striking the front of the container.

In my present and preferred way of using the Ecolarium Lights I make a terraneous shelf of clean plastic. This shelf is held in place at the approximate horizontal center line of the container to prevent water from getting under the light fixture on this shelf which would prevent proper illumination of the aqueous area. I secure a box or ring 1½ to 2 inches in height at the desired location of the Ecolarium Light and on this ring I set the light, the light thus is directed downward through this ring into the aqueous area. Algae growth thus being restricted to areas which receive direct light rays. By cutting out windows in buildings or vehicles or eyes in animals, birds, sculptures the heat generated by the bulbs would escape through these holes, at the same time they would provide ornamental illumination of the terraneous garden. An approved electrical cord would run from the base of the fixture through the soil layer and out the upper back side of the container. Since the primary purpose is to light the aqueous area the bulb would be mounted in the cap of the structure by having the male connector mounted on the cap as shown by FIG. 3 No. 5. It may be simply and safely lifted for changing of the bulb without removing the entire ornament which would be surrounded by soil and plants.

Still other objects, advantages and improvements will become apparent from the accompanying drawings.

BRIEF DESCRIPTION OF THE DRAWINGS

FIG. 1 is an Ecolarium Light in the form of a lighthouse.

FIG. 2 is an Ecolarium showing the placement of the Ecolarium Light on the terraneous shelf.

FIG. 3 is the cap containing the light socket and male connector.

FIG. 4 is a top view of the base looking down into the cavity where the bulb would enter when the cap is in place.

DETAILED DESCRIPTION OF THE INVENTION

Referring now to the drawings in detail:

FIG. 3 the Ecolarium containing the Ecolarium Light No. 11 is the transparent terraneous shelf with the light structure setting on top. No. 9 shows the light rays penetrating through the shelf into the water area through the shelf into the water area below. No. 10 the rays shining into the terraneous area. The cut out shows the placement of the bulb when it is in place.

FIG. 1 the actual Ecolarium Light which could be in the form of a barn house or other ornament containing the same lighting. No. 1 is the electrical cord which would be leaving the barn and should be approved for soil covering since it will lay on the terraneous shelf and be covered with soil until it leaves the container. No. 3 indicates the upper light and heat vents. No. 2 the top of the base structure containing the female connector in FIG. 4 and also the cavity No. 8 where the cap FIG. 3 containing the cap No. 4 the male connectors No. 5 and the bulb No. 6 are inserted when in place on the base structure.

It will thus be appreciated that with the present invention there is provided an extremely economic light that may be mounted on the terraneous shelf of an Ecolarium (ecology tank, two-tiered aquarium). While I have illustrated and described one embodiment of my invention it is to be understood that such is merely illustrative and not restrictive and that variations and modifications may be made therein without departing from the spirit and scope of the invention.

I therefore do not wish to be limited to the precise details set forth but desire to avail myself of such changes as fall within the purview of my invention.

I claim:

1. The combination of an ornamental lighting device and a display comprising a transparent shelf, at least one ornamental sculpture seated on said shelf, said sculpture including a transparent base member in contact with said shelf, non-transparent side and top members, at least one transparent aperture in said non-transparent members and means for illumination contained within said sculpture, said at least one sculpture being surrounded on said shelf with means for simulation of a land environment, and means below said shelf for simulation of water environment whereby said at least one transparent aperture and said transparent base permits said means for illumination to illuminate both said simulated land and water environments.

2. A lighting sculpture as in claim 1 formed of Wood.

3. A lighting sculpture as in claim 1 formed of ceramic material.

4. A lighting sculpture as in claim 1 formed of metal.

5. A lighting sculpture as in claim 1 formed of plastic.

* * * * *